United States Patent [19]

Malivoir et al.

[11] Patent Number: 4,535,882
[45] Date of Patent: Aug. 20, 1985

[54] METHOD AND APPARATUS FOR ARRANGING CAST-IRON PIPES IN ODD NUMBER STACKS

[75] Inventors: Roger Malivoir, Pont-a-Mousson; Gilbert Mayer, Nancy, both of France

[73] Assignee: Pont-a-Mousson S.A., Nancy, France

[21] Appl. No.: 548,586

[22] Filed: Nov. 3, 1983

[30] Foreign Application Priority Data

Dec. 24, 1982 [FR] France .................................. 82 21855

[51] Int. Cl.³ ............................................. B65G 47/30
[52] U.S. Cl. ...................................... 198/425; 414/31; 414/63; 414/745
[58] Field of Search ...................... 414/30, 31, 63, 745, 414/786; 198/425, 491

[56] References Cited

U.S. PATENT DOCUMENTS 4,441,847 4/1984 Malivoir et al. ....................... 414/31

FOREIGN PATENT DOCUMENTS 2358725 7/1974 Fed. Rep. of Germany ...... 198/425
2092091 8/1982 United Kingdom .................. 414/30

Primary Examiner—Leslie J. Paperner
Attorney, Agent, or Firm—Sughrue, Mion, Zinn, Macpeak & Seas

[57] ABSTRACT

Between an upstream transporter A which moves discontinuously and intermittently and a downstream transporter B which moves continuously, an elevator C is serially disposed which lifts the last pipe T6 from an even group T1 through T6 astride both transporters, then rests it ahead of the following even group T7 through T10 during a halt of transporter A. On the downstream transporter B, two odd groups T1 through T5 and T6 through T10 and thus obtained. The pipes each have an enlarged female bell or mouth M at one end, and are alternatingly arranged in horizontal groups or beds L of five. Each bed is reversed relative to its adjacent beds in a banded vertical pile. The pipes are supplied to the transporter A two at a time.

8 Claims, 13 Drawing Figures

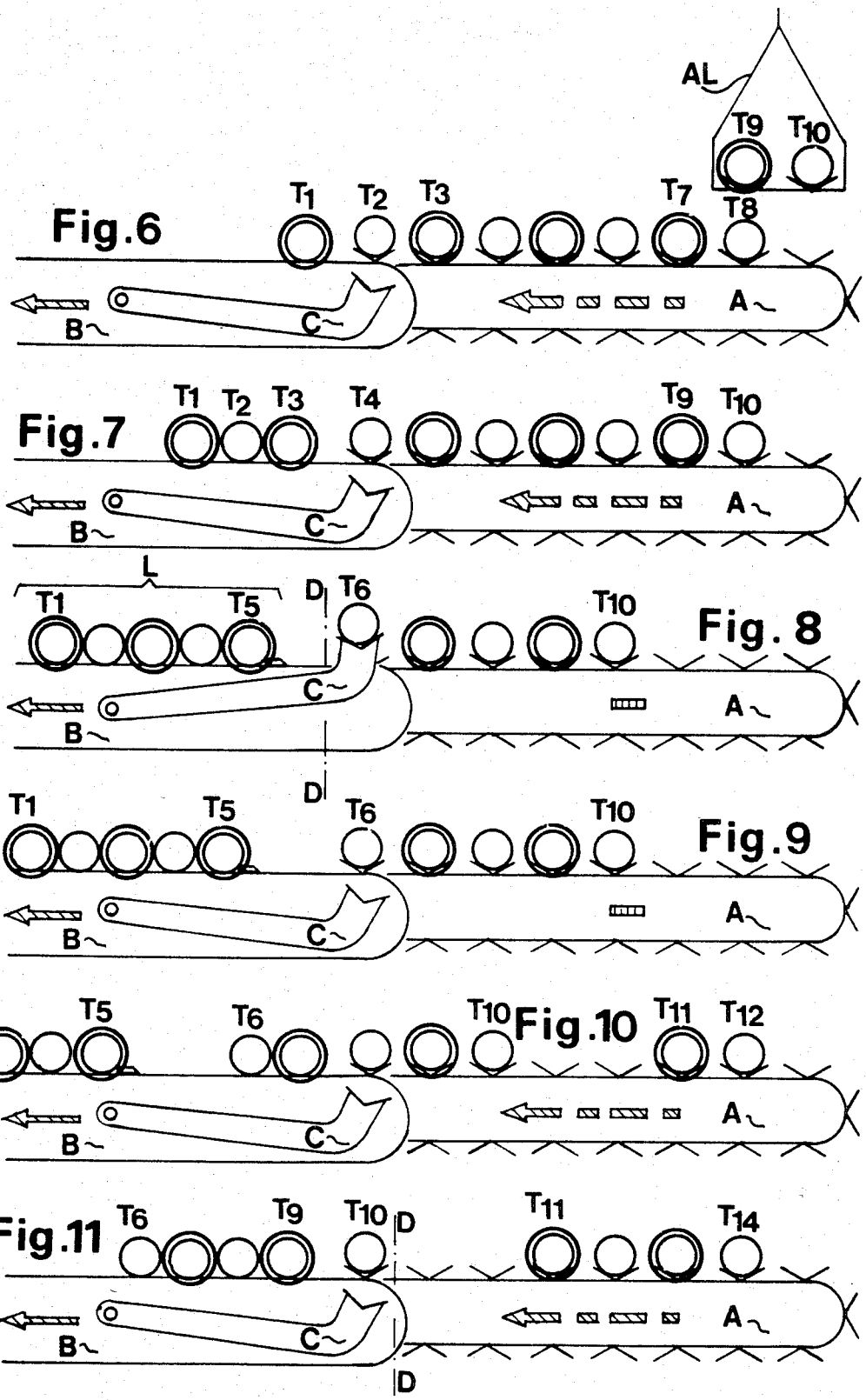

METHOD AND APPARATUS FOR ARRANGING CAST-IRON PIPES IN ODD NUMBER STACKS

BACKGROUND OF THE INVENTION

This invention pertains to the handling and bundling of cast-iron pipes manufactured in centrifuging machines. More specifically, the invention pertains to the handling of pipes between a horizontal upstream transporter on which the pipes are placed head to tail in even numbers, an enlarged end mouth alternating with a uniform end of the adjacent pipe, and a downstream transporter which receives the pipes in odd numbered beds which are later piled in fagots.

In French patent application filed on Nov. 20, 1981 as No. PV 81 21 931 (U.S. Pat. No. 4,441,847) a method is described for rapidly piling beds of pipes onto a carriage in order to assemble pipe fagots. In another French patent application filed on Apr. 16, 1982 as No. PV 82 06 718 a method is described for placing the pipes head to tail on a horizontal transporter as they exit from the centrifuging machines in groups of two with their uniform and mouth ends side by side and not head to tail, wherein a pipe is occasionally removed after quality control because it does not meet specifications.

To assemble on the downstream transporter beds of head to tail pipes in even numbers when the pipes are already arranged head to tail in even numbers on the upstream transporter, a simple transfer of each group from one transporter to the next is adequate.

This invention addresses the problem of assembling on the downstream transporter beds of head to tail pipes in odd numbers with the pipes arranged head to tail in even numbers on the upstream transporter, therefore of transforming groups of even numbers into groups of odd numbers.

This problem might be resolved by transferring one by one the pipes from one transporter to another, but this would involve slow handling and is not adapted to a fast input of pipes in twos from centrifugal production. This might also create an obstruction between the upstream transporter which moves intermittently two steps at a time, one step equal to the interval between two consecutive pipes, and the downstream transporter which moves continuously.

SUMMARY OF THE INVENTION

This invention concerns a method and apparatus for transforming an even group into an odd group during the rapid conveyance of pipes by transferring two pipes at a time between the upstream and the downstream transporters, a single pipe being retained to obtain an odd number from an even number.

The method is characterized by forming double groups of pipes of which the number is double that of the odd number of pipes desired for each bed. Within each double group an even number which is greater by one unit than the desired odd number is transferred by leaving the last pipe of said initial even group astride the two transporters. This last pipe is then temporarily withheld, and subsequently brought back ahead of the second following even group to be transferred, of which the even number is lower by one unit than the desired odd number.

The invention also pertains to an apparatus for implementing this method, which includes an upstream transporter of endless parallel chains equipped with individual V-shaped pipe supports, placed at regular steps or intervals, said chains advancing discontinuously two steps at a time to receive pipes in pairs from the production area, and following this, a similar downstream transporter advancing continuously. Between the ends of the chains of the upstream and downstream transporters which overlap one another, an elevator is inserted for a single pipe which can take up two positions, a working one located above the level of the transporter chains, and a rest one located below said chains.

The transfer takes place quickly not only because two pipes at a time go from the upstream to the downstream transporter, but because during a regular stoppage of the intermittent upstream transporter, without adding dead time, the one pipe is temporarily withheld.

BRIEF DESCRIPTION OF THE DRAWINGS

FIGS. 6 through 11 are schematic views which illustrate the movement of the pipes and their transfer from one transporter to the next in transforming even groups into odd groups.

DETAILED DESCRIPTION OF THE PREFERRED EMBODIMENTS

Figure 1:
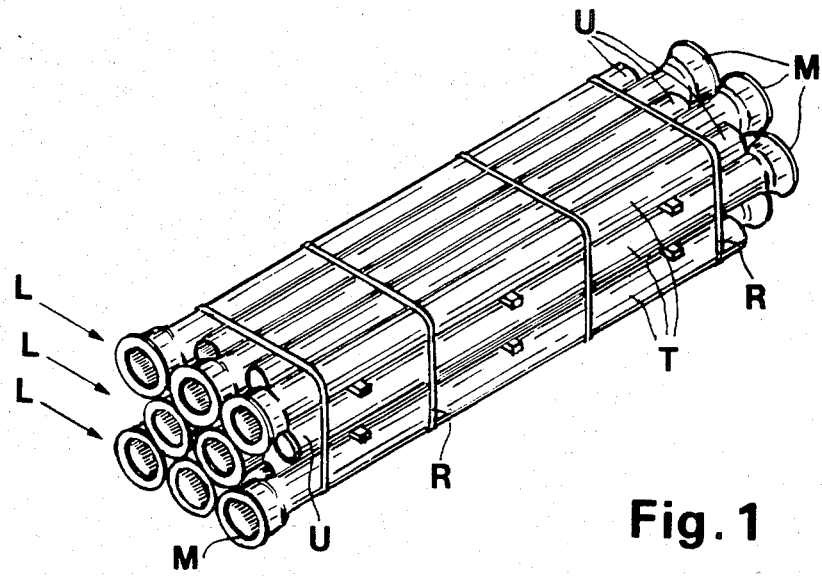
FIG. 1 is a perspective view of a fagot of pipes to be obtained comprised of beds or groups of pipes in odd numbers, with a head to tail arrangement.
Figure 3:
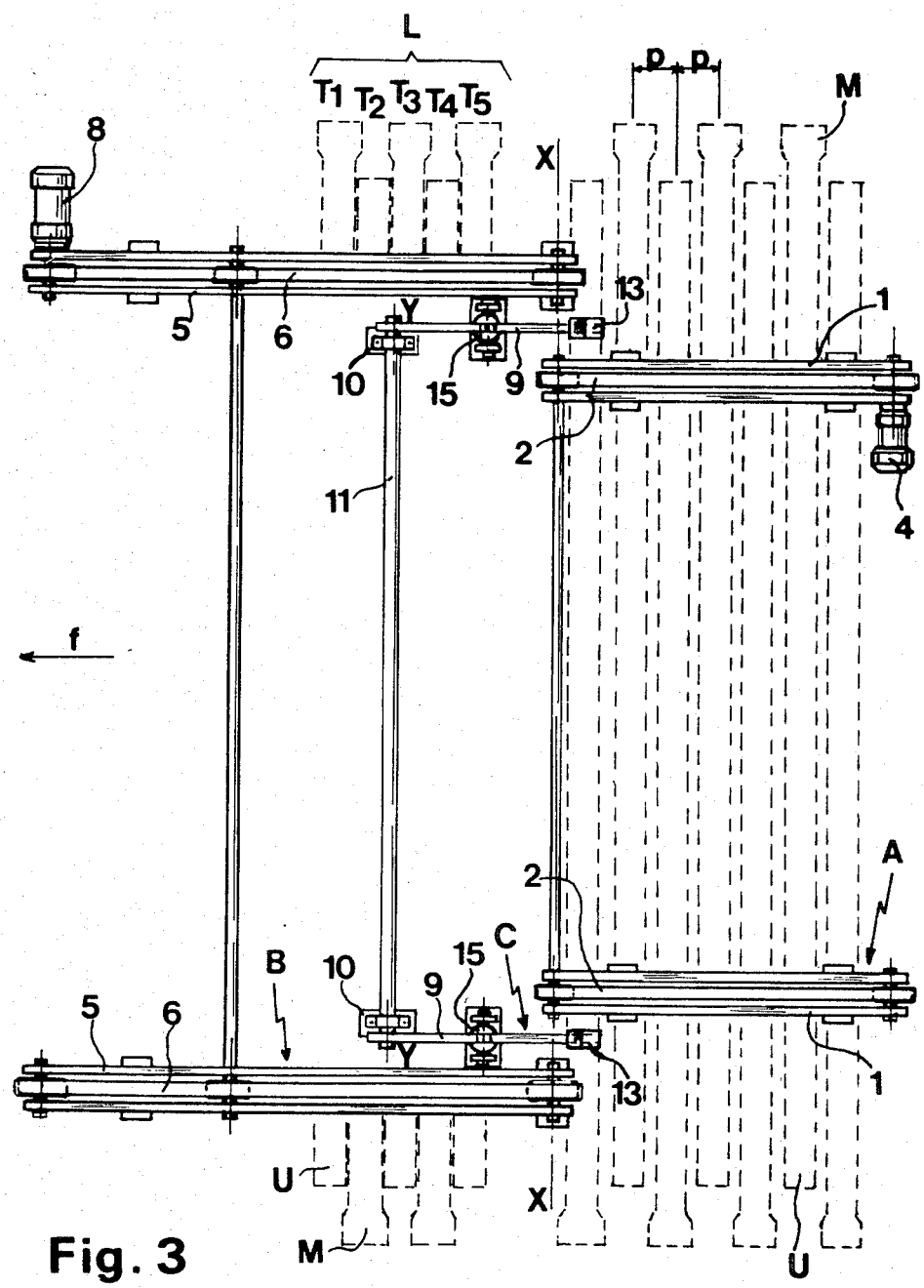
FIG. 3 is a schematic plan view with the pipes, in broken lines, placed head to tail and forming an odd bed on the downstream transporter.

The invention is applied to the manufacture of fagots of cast-iron pipes T connected by metal or plastic bindings or bands R. As is known, the pipes are placed in vertically superimposed beds L head to tail, a mouth end M alternating with a uniform end U of a neighboring pipe to reduce the crowding in each fagot (FIG. 1). In particular, the invention is applied to arranging beds as shown in FIG. 3, wherein five identical pipes T1 through T5 (in broken lines) from a bed L are shifted lengthwise one in relation to the other by a length which corresponds at least to that of a mouth fitting M. The invention therefore applies to the arrangement of beds or groups of pipes in odd numbers, whereas the pipes are produced in even numbers.

Figure 2:
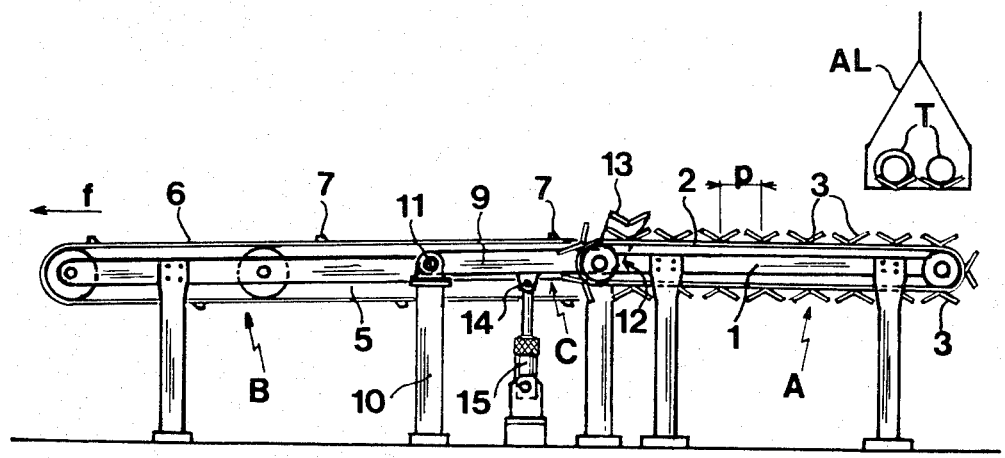
FIG. 2 is a small-scale elevated schematic view of a facility for implementing the method of the invention.

According to the embodiment of FIGS. 2 and 3, the invention includes two pipe transporters conveying in a direction indicated by arrow f, an upstream transporter A which receives the head to tail pipes in pairs and a downstream transporter B which delivers the pipes in odd groups or beds, and between them a set-aside means for a single pipe comprising an elevator C.

The pipes T are conveyed in pairs to the transporter A, for instance by a lifting device AL on which they are placed parallel to one another head to tail.

The transporter A includes a frame 1 which bears a pair of parallel endless chains 2 that carry V-shaped cradles 3 serving as individual supports for the pipes and regularly spaced by one step p. The chains 2 are driven by a motor/reduction gear unit 4 in an intermittent or discontinuous manner. The intermittent motions, which are regularly separated by stops, follow a course which is equal to two steps (2p) to move the pipes in twos. The pipes are placed in pairs on the cradles 3 crosswise to the chains 2 and to the lead direction f.

The transporter B includes a frame 5 having parallel endless chains 6 whose links, now shown, form a nearly continuous plane surface for supporting the pipes and which therefore have no defined individual placement like the cradles 3. The chains 6 carry spaced thrust or drive stops 7 for a bed of pipes, removably affixed to specific links in the chains. The chains 6 are driven continuously by a motor/reduction gear unit 8.

The transporters A and B are arranged in the following way, so as to enable the transfer of pipes from transporter A to transporter B:

The downstream end of transporter A as defined by the return wheels of the endless chains 2 is coaxial to the upstream end of the transporter B; the coaxiality of these two ends is indicated by the crosswise axis XX of the return wheels of the chains 2 and 6. The ends of the transporters thus overlap by one step p at the axis XX. Furthermore, the upper support area of the chains 6 of the transporter B is slightly lower than that of the hollows of the cradles 3 of the chains 2 of transporter A.

The spacing between the chains 6 is greater than between the chains 2, although smaller than the length of a pipe T such that the ends M and U overhang the chains 6. The length of a cast-iron pipe T is typically at least 6 meters, but obviously the invention also applies to shorter pipes.

Beyond the transporter B there are piling means for beds of pipes that are conveyed by the transporter, such as those described in French patent application No. PV 81 21 931.

The elevator C is disposed between chains 2 and 6 of transporters A and B (FIGS. 2-3-4-5) and comprises a pair of levers or elevator arms 9 articulated at one end on posts 10, by axle 11 having a YY axis parallel to axis XX. The levers 9 are spaced from one another by a distance intermediate the spacings between the parallel chains 2 and 6.

At their other ends, in the vicinity of the axis XX, the levers 9 have elbows 12 which each carry a cradle 13 serving as an individual support for a pipe T in a horizontal position, which is identical or analogous to the cradles 3 of transporter A.

Intermediate their ends each lever 9 is articulated at 14 to the piston rod of a fluid pressure jack 15; both jacks operate in synchronism. The pair of levers 9 of elevator C can thus take up two positions: a low or rest position (FIG. 4 in which the cradles 13 are below the support level of chains 2 of transporter A), and a high or work position in which the cradles are above the cradles 3 of transporter A.

Operation (FIGS. 4, 5 and 6 through 11)

Figure 4:
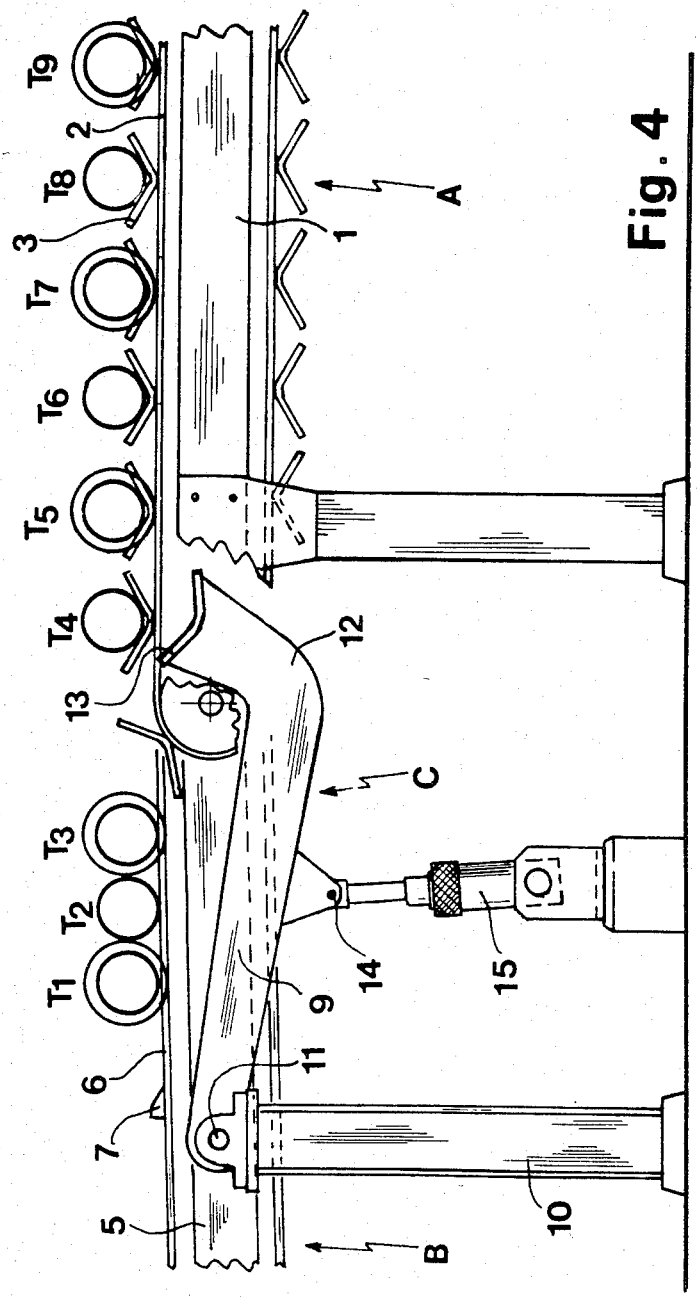
FIG. 4 is an elevated schematic view on a larger scale than FIG. 2, of at least part of the transporters and of the elevator device in a withdrawn or rest position.
Figure 5:
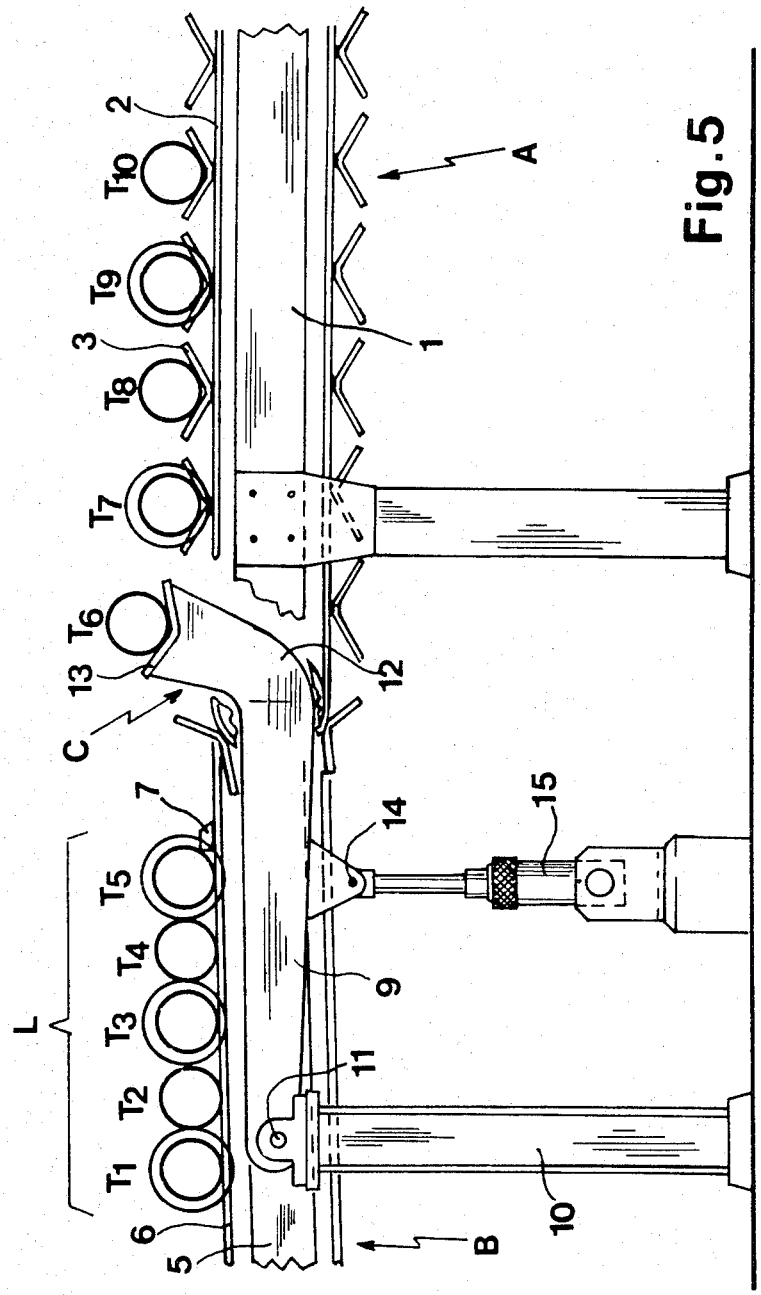
FIG. 5 is an elevated view similar to FIG. 4 of the elevator in the upper or working position.

To transfer head to tail pipes T1 to T10 in even numbers from transporter A to transporter B to be assembled into odd beds L of five pipes each, the upstream transporter A receives the pipes in pairs, head to tail, from the lifting device AL which deposits them onto two consecutive cradles 3. The transporter A moves forward intermittently two steps at a time while the transporter B moves continuously. At each two step (2p) move, the transporter A normally drops or transfers two pipes at a time onto transporter B, the elevator C being in the low position (FIG. 4).

Referring to FIGS. 6 through 11 the sequence for forming two successive beds of five pipes numbered T1 through T5 and T6 through T10 from ten pipes deposited in pairs on transporter A will be described.

FIG. 6 (transporters A and B in motion—elevator C in a low position): pipe T1 has just been transferred to transporter B. Pipes T2, T3, and T4 are at the downstream end of the transporter A. Pipe T2 is above the cradles 13 of the elevator C and astride the transporters A and B. The transporter A is filled up to pipe T8. A pair of pipes T9 and T10, which are head to tail, are ready to be deposited by the lifting device AL on the transporter A, after pipe T8.

FIG. 7 (transporters A and B in motion—elevator C in a low position): pipes T2 and T3 have just been transferred onto transporter B. Pipes T4, T5 and T6 are at the downstream end of transporter A. Pipe T4 is above the cradles 13 of elevator C. Pipes T9 and T10 have been deposited after pipe T8 on the upstream transporter A.

FIG. 8 (transporter A stopped—elevator C in high position): Prior to its stoppage, transporter A having moved by two steps from FIG. 7 transferred pipe T5 onto transporter B and brought pipe T6 above the cradles 13 of elevator C. The demarkation line D between the bed L of pipes T1 through T5 which is on the transporter B, and the following bed L to be formed, is traced between pipes T5 and T6. During a regular stoppage of transporter A, when pipe T6 is in the overlapping zone of the two transporters, elevator C is raised to the high position and lifts pipe T6 above transporters A and B while transporter B in motion conveys the first bed of pipes T1 through T5 away with a drive stop 7. This lifting of pipe T6 above the cradles 3 prevents it from being driven by transporter B, and gives the first bed of pipes T1 through T5 time to advance.

Pipe T6 is therefore temporarily withheld during the short stoppage of transporter A. Furthermore, after pipe T10 which ends the two successive beds of five pipes, at least two successive cradles 3 are left empty on transporter A in order to separate with a minimal interval of two steps all of the pipes T1 through T10 from the following "double" unit of pipes T11 through T20.

FIG. 9 (transporter A stopped—elevator C in low position): During the stoppage of transporter A, elevator C is lowered and deposits anew pipe T6 astride transporters A and B at the exact spot which it had left on cradles 3 at the level of FIG. 8 Transporter B further advances the odd bed formed by pipes T1 through T5.

FIG. 10 (transporters A and B in motion—elevator C in low position): After an advance of two steps by transporter A, pipe T6 and T7 are transferred to transporter B. The following pipe T8 is ready for transfer, and pipes T9 and T10 will be transferred in turn prior to the inlet of the two empty cradles 3 from transporter A. Furthermore, the lifting device AL deposited on transporter A pipes T11 and T12.

FIG. 11 (transporters A and B in motion—elevator C in low position): Pipe T9 is deposited on transporter B. Pipe T10 is above cradles 13 from elevator C. Elevator C remains in the low position. Pipe T10 will be transferred, and the demarkation line D after pipe T10 signals the end of the second odd bed and of the first double group. The empty two step interval between pipe T10 and pipe T11 separates the second from the third odd beds, and the first from the second double groups. The lifting device AL has deposited pipes T13 and T14 on transporter A.

The cycle thus continues to form double groups of two odd beds T11 through T20, T21 through T30, etc., the double groups of two odd beds being separated by empty two step intervals without elevator C intervening. Elevator C only intervenes with pipes T6, T16, T26, T36, etc.

Obviously, the above method can also be applied to assembling beds of three pipes, seven pipes, etc.

Figure 12:
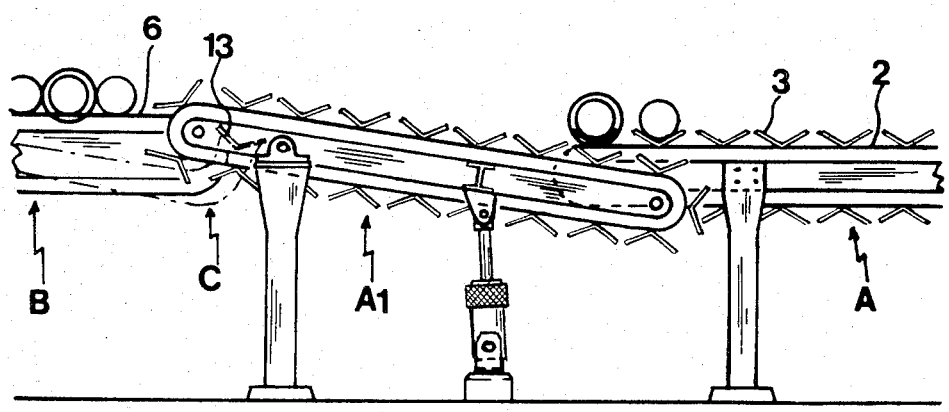
FIGS. 12 and 13 are elevated schematic views analogous to FIG. 4 of an implementation variation with an intermediate ascending transporter, respectively in a low position and in a high position, where the upstream transporter is at a level which is lower than the downstream transporter.
Figure 13:
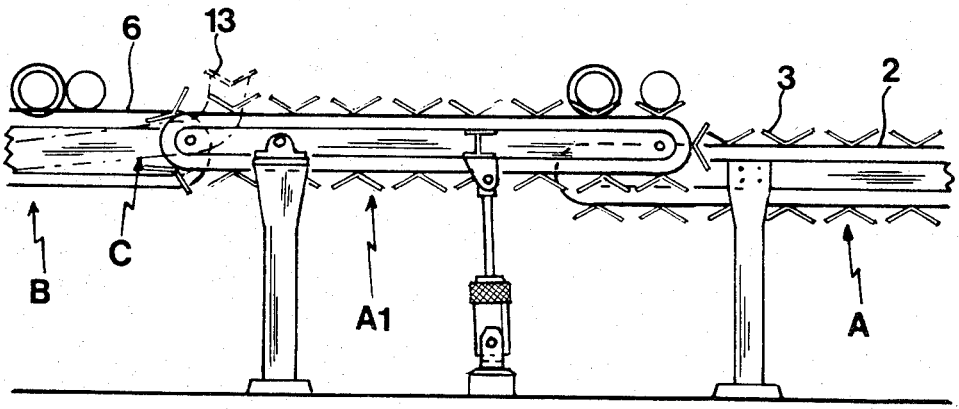

As a variation of the invention (FIGS. 12 and 13), the chains 6 of the downstream transporter B can be higher than chains 2 of the upstream transporter A. To transfer pipes between transporters A and B, an ascending intermediate transporter A1 with individual support cradles for the pipes with spaces between them like those of transporter A is inserted, said intermediate transporter A1 advancing at the same discontinuous rate as transporter A and overlapping both transporters A and B. The transporter A1 is tilted with an ascending slope toward the downstream transporter B, and is combined with the elevator C and with the transporter B in the same way as the upward transporter A in the embodiment described above.

In the low position (FIG. 12), A1 collects the pipes in pairs. In the high position (FIG. 13) at which it is slightly above the transporter B, which brings us back to the previous example, it transfers the pipes onto transporter B with interventions on occasion from elevator C.

In other words, in order to obtain odd groups from even groups, the ascending intermediate transporter A1 is the equivalent of the upstream transporter A.

Still as a variation, in order to manufacture odd beds using the facility of FIGS. 2 through 5, instead of filling the upstream transporter A with pairs of pipes arranged head to tail, one could simply fill transporter A with an even number of pipes which is equal to the desired odd number for each bed increased or lowered by one unit. But the role and operation of elevator C with levers 9 remain the same as previously mentioned.

For instance, for beds L of five pipes, first six pipes are deposited on transporter A and conveyed towards transporter B to liberate transporter A, retaining the sixth pipe with elevator C as previously described. The withheld pipe is then lowered and four more pipes are placed on the upstream transporter A, and transferred to the downstream transporter B. Thus, even after receiving six pipes on transporter A, whereas one would have to evacuate only five onto transporter B in order to manufacture an odd bed, transporter A is completely freed by setting aside the sixth pipe so that it can receive four new pipes, which will be evacuated with the one which was set aside.

What is claimed is:

1. A method for arranging elongate pipes in horizontal, odd numbered beds, each pipe having a uniform male end and an enlarged female mouth end, and the pipes being delivered from a supply source in reversed pairs with a male end of one pipe adjacent a female end of the other pipe, comprising the steps of:
    (a) forming a double group of pipes on a first transporter (A), the number of pipes being twice that desired for each bed,
    (b) conveying an initially even number of said double group of pipes onto a second, serially disposed transporter (B), said even number being one greater than the desired odd number of pipes in each bed,
    (c) withdrawing the last pipe from said even number as it passes between the first and second transporters, and simultaneously halting the first transporter to allow the remaining odd number in the initially even number to be conveyed away a separation distance on the second transporter, and
    (d) introducing the withdrawn last pipe as the first pipe in the even number of pipes remaining on the first transporter.

2. A method according to claim 1, wherein successive double groups of pipes are formed with a spacing between them equal to said separation distance.

3. An apparatus for arranging elongate pipes in horizontal, odd numbered beds, each pipe having a uniform male end and an enlarged female mouth end, and the pipes being delivered from a supply source in reversed pairs with a male end of one pipe adjacent a female end of the other pipe, comprising:
    (a) a first, horizontally oriented upstream transporter (A) including spaced, parallel endless chains (2) and a plurality of V-shaped pipe supports (3) mounted on said chains at regular intervals,
    (b) drive means (4) for intermittently advancing said first transporter in steps equal to twice the distance between adjacent pipe supports,
    (c) a second, horizontally oriented downstream transporter (B) including spaced, parallel endless chains (6), said second transporter being disposed in series with the first transporter and such that an input end of the second transporter overlaps an output end of the first transporter,
    (d) drive means (8) for continuously advancing said second transporter,
    (e) a single pipe elevator (C) disposed between overlapping ends of the chains of the first and second transporters, and
    (f) means (15) for selectively raising and lowering said elevator between a first position above the level of the chains and a second position below the level thereof.

4. An apparatus according to claim 3, wherein the amount of overlap between the first and second transporters is equal to the distance between adjacent pipe supports.

5. An apparatus according to claim 3, wherein the spacing between the parallel chains of the downstream transporter is greater than that between the parallel chains of the upstream transporter but less than the length of a pipe (T) to be handled.

6. An apparatus according to claim 3, wherein the downstream transporter is at a slightly lower level than that of the upstream transporter.

7. An apparatus according to claim 3, wherein the elevator includes a pair of articulated lifting levers (9) controlled by synchronized jacks and each carrying an individual support cradle (13) for a pipe, said pair of cradles being disposed proximate the output end of the upstream transporter and the input end of the downstream transporter, hollows of said cradles being in the vicinity of an axis (XX) common to both of said ends.

8. An apparatus according to claim 3, further comprising, when the downstream transporter is at a level above that of the upstream transporter, an ascending intermediate transporter (A1) with individual pipe support cradles disposed between the upstream and downstream transporters.

* * * * *